United States Patent [19]

Dai

Patent Number: 5,208,270
Date of Patent: May 4, 1993

[54] CATALYST SYSTEMS USEFUL FOR FORMING ISOCYANURATE, AMIDE AND/OR OXAZOLIDINONE GROUPS AND A METHOD FOR THEIR USE

[75] Inventor: Shenghong A. Dai, Lake Jackson, Tex.

[73] Assignee: The Dow Chemical Company, Midland, Mich.

[21] Appl. No.: 913,111

[22] Filed: Jul. 14, 1992

Related U.S. Application Data

[63] Continuation-in-part of Ser. No. 816,914, Jan. 3, 1992, abandoned.

[51] Int. Cl.$^5$ ............................................. C08G 18/14
[52] U.S. Cl. ...................................... 521/129; 528/49; 528/53; 502/167
[58] Field of Search ..................... 521/129; 528/45, 53; 502/167

[56] References Cited

PUBLICATIONS

U.S. patent application 07/612,723 filed Nov. 13, 1990 which is a continuation in part of U.S. patent application 07/382,527 filed Jul. 19, 1989; Applicants: T. W. Bodner, L. A. Cole and S. A. Dai.

Primary Examiner—Maurice J. Welsh

[57] ABSTRACT

Two component catalyst systems containing (1) a N,N',N''-tris(N,N-dialkylaminoalkyl)-s-triazine component, and (2) a monocarboxylic acid component wherein the monocarboxylic acid component is one or more monocarboxylic acids having 4 to about 18 carbons are useful for polymerizing di- or poly-isocyanates, and, optionally, epoxies. The catalyst systems can often be particularly useful for preparing polymer foams which have good heat resistivity and dimensional stability properties compared to conventionally formed foams. The ratio of the two components of the catalyst system, along with the amount of the catalyst system used to prepare a polymer formulation, can be adjusted such that the monocarboxylic acid component can react with isocyanate group containing compounds in the foam formulations to provide carbon dioxide to function as a sole blowing agent, or as a partial blowing agent used in conjunction with other conventional blowing agents.

20 Claims, No Drawings

CATALYST SYSTEMS USEFUL FOR FORMING ISOCYANURATE, AMIDE AND/OR OXAZOLIDINONE GROUPS AND A METHOD FOR THEIR USE

CROSS REFERENCE TO RELATED APPLICATION

This application is a continuation in part of application Ser. No. 07/816,914, filed Jan. 3, 1992 and now abandoned.

BACKGROUND OF THE INVENTION

This invention relates to catalyst systems useful for forming isocyanurate, amide and/or oxazolidinone groups. This invention particularly relates to catalyst systems useful for preparing polymer foams having isocyanurate, amide and/or oxazolidinone groups.

Preparing polymers from formulations containing di- and poly-isocyanates is a familiar process. Of these polymers, polyurethanes have been among the most useful. Polyurethanes have been widely used for preparing thermoplastics, resins, coatings, and both flexible and rigid polymer foams.

In some rigid foam applications, it has been found desirable to improve certain foam physical properties. For example, much work has been done to improve the high temperature and flammability performance of foams prepared with formulations containing di- and poly-isocyanates. Generally, attempts to improve these properties have centered around introducing structures different from urethane groups into the polymer foams. For example, U.S. Pat. No. 4,066,580 to Falkenstein, et al., discloses preparing foams which may be difficult to ignite which have both urethane and isocyanurate groups. The Falkenstein foams are prepared using a bicomponent catalyst system consisting of a 1,3,5-tris-(N,N-dialkylaminoalkyl)-s-hexahydrotriazine component and a mono- or poly-carboxylic acid component wherein the molar ratio of the triazine to carboxylic acid is from 30:1 to 0.7:1, with 1:1 being a particularly preferred ratio. (For comparison purposes, this is a ratio of carboxylic acid component to triazine component of from 0.03:1 to 1.43:1.) U.S. Pat. No. 3,793,326 to Ashida, et al., discloses that foams prepared from resins having isocyanurate and oxazolidinone groups have low friability and high flame resistivity. The Ashida foams are prepared by catalyzing the reaction of a polyisocyanate and a polyepoxide by means of a Friedel Crafts catalyst such as $FeCl_3$ and catalyzing the formation of isocyanurate groups by means of a trimerization catalyst such as a tertiary amine. U.S. Pat. No. 4,738,990 to Nelb, II, et al., discloses preparing fire resistant foams having primarily amide and imide linkages. The Nelb foams are prepared by catalyzing the reaction of a poly-isocyanate and an aromatic poly-carboxylic compound by means of a cyclic phosphorous catalyst.

In addition to catalysts and reactants such as polyisocyanates, polymer foams can be prepared from formulations containing one or more blowing agents. In the context of the present invention, a blowing agent is a material which produces, or is converted to, a gas which acts to form bubbles within a forming polymer, the bubbles expanding and making the polymer cellular, thereby producing a foamed polymer.

Conventional halocarbon compounds known as "hard" halocarbons, particularly polyhaloalkanes such as trichlorofluoromethane, have traditionally been used as blowing agents in preparing rigid polyurethane foams for insulating purposes. These compounds are highly effective blowing agents that combine low cost with excellent thermal properties, generally described as relatively low "K" factor values. However, due to current environmental concerns, researchers are being forced to search for methods of preparing these foams which reduce or eliminate the so-called "hard" halocarbons.

Much of this work has centered on the so-called "soft" halocarbons as blowing agent replacements for the "hard" halocarbons. However, these materials also have aroused some environmental and toxicity concerns. One alternative blowing agent is carbon dioxide. Carbon dioxide and carbon dioxide generating agents can sometimes be used to prepare polymer foams.

Therefore, it would be desirable to prepare heat resistant polymers, particularly polymer foams, which have groups other than only urethane groups. It would also be desirable that these polymers, if foamed, could be prepared from formulations including reduced or no "hard" or "soft" halocarbon blowing agents.

SUMMARY OF THE INVENTION

In one aspect, the present invention is a catalyst system comprising an N,N',N''-tris(N,N-dialkylaminoalkyl)-s-triazine component and a monocarboxylic acid component containing a monocarboxylic acid, or a mixture of monocarboxylic acids having from 4 to about 18 carbons wherein the molar ratio of the monocarboxylic acid component to the N,N',N''-tris(N,N-dialkylaminoalkyl)-s-triazine component is from about 2:1 to about 25:1.

In another aspect, the present invention is a method of preparing a polymer comprising reacting a di- or poly-isocyanate in the presence of an effective amount of a mixture containing a N,N',N''-tris(N,N-dialkylaminoalkyl)-s-triazine component and a monocarboxylic acid component containing a monocarboxylic acid, or a mixture of monocarboxylic acids having from 4 to about 18 carbons, wherein the the molar ratio of the monocarboxylic acid component to the N,N',N''-tris(N,N-dialkylaminoalkyl)-s-triazine is from about 2:1 to about 25:1.

In yet another aspect, the present invention is a polymer prepared by foregoing method.

The catalyst systems of the present invention can advantageously be used to prepare polymers, which can be foamed polymers, incorporating various non-urethane groups. The non-urethane groups can impart desirable properties such as improved flame resistivity, dimensional stability and high temperature performance to the foams. The monocarboxylic acid component of the catalyst systems of the present invention can react with isocyanates to produce carbon dioxide. Wherein a catalyst of the present invention is used in foam formulations, the molar ratio of the monocarboxylic acid component to the N,N',N''-tris(N,N-dialkylaminoalkyl)-s-triazine component and the amount of catalyst used to prepare the formulation can be adjusted to a level such that there can be sufficient monocarboxylic acid component available to provide carbon dioxide sufficient to function as part or all of the blowing agent required to form a foam.

DESCRIPTION OF THE PREFERRED EMBODIMENTS

In one aspect, the present invention is a catalyst system comprising an N,N',N''-tris(N,N-dialkylaminoalkyl)-s-triazine component and a monocarboxylic acid component. The triazine component corresponds to the general formula:

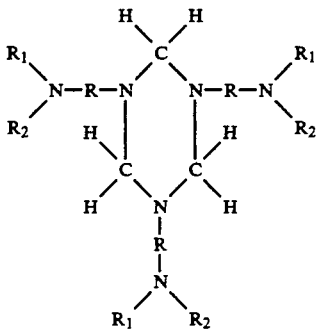

wherein
each R is independently a $C_1$–$C_4$ alkylene group; and wherein
each $R_1$ and $R_2$ are independently a $C_1$–$C_{10}$ linear or branched alkyl.

Exemplary triazine compounds include but are not limited to N,N',N''-tris-(N,N-dimethylaminomethyl)-s-triazine, N,N',N''-tris-(N,N-dimethylaminoethyl)-s-triazine, N,N',N''-tris-(N,N-diethylaminoethyl)-s-triazine, N,N',N''-tris-(N,N-dimethylaminopropyl)-s-triazine, N,N',N''-tris-(N,N-dimethylaminoisopropyl)-s-triazine and the like. Any compound or mixture of compounds corresponding to the general formula hereinabove can be used to prepare the catalyst systems of the present invention, but N,N',N''-tris-(N,N-dimethylaminopropyl)-s-triazine and N,N',N''-tris-(N,N-dimethylaminoethyl)-s-triazine are preferred triazine catalyst components.

The catalyst systems of the present invention also contain a monocarboxylic acid component which includes a monocarboxylic acid which has from 4 to about 18 carbons or a mixture of such monocarboxylic acids. Ethyl hexanoic acid, ethyl butyric acid and isobutyric acid are preferred monocarboxylic acids because of commercial availability and performance. For example, the monocarboxylic acid component of the present invention can include representative compounds such as ethyl hexanoic acid, ethyl butyric acid and isobutyric acid alone or in combination.

The ratio of monocarboxylic acid component to triazine component in the catalyst system of the present invention is important. While it has generally been found that the complexation of most amine catalysts with carboxylic acids drastically deactivates the ability of the catalyst to promote the forming of, for example, isocyanurate groups, the monocarboxylic acid and triazine components of the present invention can be combined in high monocarboxylic acid to triazine molar ratios without the drastic loss of catalytic capability. In the practice of the present invention, the molar ratio of the monocarboxylic acid component to the N,N',N''-tris(N,N-dialkylamino-alkyl)-s-triazine component is from about 2:1 to about 25:1, preferably from about 6:1 to about 12:1.

The monocarboxylic acid component of the catalyst systems of the present invention can react with isocyanates to produce carbon dioxide. Wherein a catalyst system of the present invention is used in foam formulations, the molar ratio of monocarboxylic acid component to N,N',N''-tris(N,N-dialkylaminoalkyl)-s-triazine component, along with the amount of catalyst system used to prepare the foam formulation, can be adjusted to provide carbon dioxide to function as part or all of the blowing agent required to form a foam.

The amount or quantity of catalyst system used to prepare a foam is also important in the practice of the present invention. Those skilled in the art of preparing foams can adjust the levels of conventional catalysts in foam formulations to achieve particular reaction profiles. The amount of catalyst system of the present invention used to prepare a polymer formulation, and the ratio of the catalyst system components therein, can also be adjusted to achieve a particular reaction profile, but can also be adjusted to provide for some or all of the foaming required to prepare a foam. While the amount of catalyst used to prepare polymer formulations will vary according to the desired density, structure and reaction profile of the polymer, the amount of catalyst system used will be from about 2 to about 20 weight percent, preferably from about 3 to about 16 weight percent, and more preferably from about 3 to about 10 weight percent.

Foams of varying densities can be prepared by adjusting both the amount of catalyst system used in a foam formulation and ratio of the acid and triazine components of the catalyst system. For example, a foam formulation having therein about 3.8 percent of a catalyst system of the present invention, the catalyst system having a molar ratio of monocarboxylic acid component to triazine component of about 6.36:1 can be used to prepare a foam having a density of about 7.5 lbs/ft$^3$ (114.3 kg/m$^3$). By increasing the amount of catalyst to about 6.3 percent and adjusting the ratio of monocarboxylic acid component to triazine component to about 11.8:1, an otherwise similar formulation can be used to prepare a foam having a density of about 4.7 lbs/ft$^3$ (75.3 kg/m$^3$).

The monocarboxylic acid component and the triazine component of the catalyst systems of the present invention can be admixed prior to being added to a polymer formulation. The two catalyst components can also be added to polymer formulations separately. Wherein a polymer foam formulation contains both an "A" side which is an isocyanate group containing formulation component and a "B" side which is an active hydrogen group containing formulation component, the two catalyst components will preferably be added either premixed or separately to the "B" side. More preferably, the catalyst system of the present invention can be added to such a polymer formulation in a third or "C" side which can contain the catalyst system as well as other additives. Wherein the catalysts systems of the present invention are used to prepare a polymer from formulations not including an active hydrogen group containing formulation component, the catalyst system is preferably not admixed with an isocyanate group containing component prior to the forming of polymer. Extended contact time between the catalyst systems of the present invention and and any polymer formulation component which is reactive or otherwise incompatible with the catalyst systems of the present invention, for example an isocyanate group containing material or an epoxy resin, prior to the forming of a polymer, should be avoided since such contact can cause undesirable properties in polymers produced therewith.

The catalyst system of the present invention can be used to prepare polymers from formulations containing organic isocyanate group containing compounds (hereinafter isocyanates). Any isocyanate which can be used to prepare polymers having isocyanurate, amide and/or oxazolidinone groups can be used with the catalyst system of the present invention. These isocyanates can be advantageously selected from organic polyisocyanates, modified polyisocyanate mixtures, and isocyanate-based prepolymers. These can include aliphatic, cycloaliphatic and preferably multivalent isocyanates such as 1,6-hexamethylenediisocyanate; 1-isocyanato-3,5,5-trimethyl-1-3-isocyanatomethylcyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures; 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates; and mixtures of polyphenyl polymethylene polyisocyanates and toluene diisocyanates.

Also advantageously used are the so-called modified multivalent isocyanates, i.e., products which are obtained through chemical reactions of the above diisocyanates and/or polyisocyanates. Exemplary are polyisocyanates containing esters, ureas, biurets, allophonates and preferably uretonimines; isocyanurate and/or urethane group containing diisocyanates; and/or polyisocyanates. Individual examples are aromatic polyisocyanates containing urethane groups, preferably having isocyanate group (NCO) contents of from about 2 to about 40 weight percent, more preferably about 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Suitable also for use with the present invention are prepolymers containing NCO groups, having NCO contents of from 2 to 30 weight percent, more preferably from 15 to 25 weight percent. Liquid polyisocyanates containing carbodiimide groups and/or isocyanurate rings, having NCO contents of from 8 to 40 weight percent, more preferably from 20 to 35 weight percent, can also be used. These include, for example, polyisocyanates based on 4,4'-, 2,4'- and/or 2,2'-diphenylmethanediisocyanate and the corresponding isomeric mixtures, 2,4- and/or 2,6-toluenediisocyanate and the corresponding isomeric mixtures, 4,4'-, 2,4'-and 2,2'-diphenylmethanediisocyanate and the corresponding isomeric mixtures; mixtures of diphenylmethane diisocyanates and polyphenyl polymethylene polyisocyanates and mixtures of toluene diisocyanates and polyphenyl polymethylene polyisocyanates and/or diphenylmethane diisocyanates.

Also useful in the present invention are: (i) polyisocyanates containing carbodiimide groups and/or urethane groups, from 4,4'-diphenylmethane diisocyanate or a mixture of 4,4'- and 2,4'-diphenylmethane diisocyanates having an NCO content of from 8 to 40 weight percent; (ii) prepolymers containing NCO groups, having an NCO content of from 10 to 30 weight percent, based on the weight of the prepolymer, prepared by the reaction of polyoxyalkylene polyols, having a functionality of preferably from 2 to 4 and a molecular weight of from 800 to 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluenediisocyanate and the corresponding isomeric mixtures.

Polymeric methylene diphenyl diisocyanate in any of its forms can also be used and is preferred. In this case it preferably has an equivalent weight between about 125 and about 300, more preferably from about 125 to about 175, and an average functionality of greater than about 2. More preferred is an average functionality of from about 2.5 to about 3.5. The viscosity of the polyisocyanate component is preferably from about 25 to about 5,000 centipoise (cps), but values from about 200 to about 1,000 cps at 25° C. are preferred for ease of processing. Similar viscosities are preferred where alternative polyisocyanate components are selected.

The catalysts of the present invention can be used to prepare a polymer. Preferably, the polymer is one having isocyanurate, amide and/or oxazolidinone groups. These groups can impart desirable properties to polymers, particularly foams. Examples of properties of urethane foams which can be improved by the presence of isocyanurate, amide and/or oxazolidinone groups include dimensional stability, insulative ability and flame resistivity. However, in preparing flame resistant foams, using polyols is often minimized except to the extent that urethane groups within the polymer impart some desirable property such as decreased friability.

Preferably, polymers prepared with the catalyst systems of the present invention are foams. Any blowing agent of mixture of blowing agents can be used in combination with the catalyst systems of the present invention in preparing the foamed polymers of the present invention. Suitable blowing agents include inorganic blowing agents such as water, organic blowing agents which are volatile at reaction temperatures and dissolved inert gases. Suitable organic blowing agents include acetone; ethyl acetate; methanol; ethanol; halogen-substituted alkanes such as methylene chloride, chloroform, ethylidene chloride, vinylidene chloride, monofluorotri-chloromethane, chlorodifluoromethane, dichlorodifluoromethane and the like; butane; hexane; heptane; diethyl ether; and the like. Gases inert to the starting components such as nitrogen, air, carbon dioxide and the like are also useful blowing agents. Compounds, such as azides, which decompose at suitable temperatures to produce gases such as nitrogen are also useful. Preferred blowing agents are compounds which boil between about −50° and 100° C., more preferably between about 0° and 50° C.

Water is a useful blowing agent for use in the practice of the invention. In addition to generating carbon dioxide gas for foaming, water reacts quickly with polyisocyanate components, thus contributing to early polymer strength needed for gas retention. Other blowing agents can be used with water.

The monocarboxylic acid component of the catalyst system of the present invention generally functions as the primary blowing agent in foam formulations. Like water, a carboxylic acid can generate carbon dioxide when reacted with an isocyanate. The monocarboxylic acid component of the present invention can be the sole blowing agent or it can be used in combination with other blowing agents such as those listed hereinabove.

Any carboxylic acid group containing compounds can be used as blowing agents in combination with the catalyst systems of the present invention for forming the foams of the present invention. However, when acids other than those already discussed hereinabove are used, care must be exercised to avoid employing those acids in such a way that they impart undesirable properties to the polymer formulation and the foam produced therewith. For example, wherein a di- or tri-carboxylic acid is chosen as a blowing agent, care should be exercised to avoid contacting the di- or tri-carboxylic acid with the catalyst system of the present invention prior to the forming of a polymer. Care should be taken that any carboxylic acid other than those suitable to prepare the catalyst systems of the present invention do not contact the triazine component prior to the triazine component of the catalyst system being combined with the monocarboxylic acid component. The catalyst systems of the present invention are generally liquid at ambient conditions, but in the presence of a di- or tri-carboxylic acid, the catalyst system can become a solid, a slurry or a viscous liquid which can be difficult to handle. Likewise, care should be taken to avoid adding too much total acidity to a polymer formulation which can alter the desired reaction and foaming profile of polymer foams produced therewith.

The amount of blowing agent used in combination with the catalyst systems of the present invention will vary with factors such as the density desired in a foamed product. Other blowing agents can also be used in combination with the catalyst systems of the present invention to impart specific properties to foams of the present invention. For example, pentane can be used in combination with the catalyst/blowing system of the present invention to impart additional dimensional stability to a foamed polymer. Other blowing agents can be selected to increase insulative properties or further lower foam density.

The catalyst systems of the present invention can be used to catalyze forming isocyanurate, amide and oxazolidinone groups. The amount of catalyst used to prepare polymers having these groups will vary with type of and the desired properties of the polymer. The catalyst systems of the present invention can also be used in combination with other catalysts to form polymers having other groups in addition to isocyanurate, amide and oxazolidinone groups. For example, the catalyst systems of the present invention can be used in combination with conventional urethane catalysts to prepare polymers having urethane groups. The urethane catalyst is preferably incorporated into the formulation in an amount suitable to increase the rate of reaction between isocyanate groups and a hydroxyl-containing species. Although a wide variety of materials is known to be useful for this purpose, the most widely used and preferred catalysts are the conventional tertiary amine catalysts and the organotin catalysts.

Examples of the traditional tertiary amine catalysts include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like. Tertiary amine catalysts are advantageously employed in an amount from about 0.01 to about 3 percent by weight of the polyol formulation.

Examples of organotin catalysts include dimethyltin dilaurate, dibutyltin dilaurate, dioctyltin dilaurate, stannous octoate and the like. Other examples of effective catalysts include those taught in, for example, U.S. Pat. No. 2,846,408. Preferably the organotin catalyst is employed in an amount from about 0.001 to about 0.5 percent by weight of the the polyol formulation.

Care must be taken that the catalysts of the present invention and other catalysts, for example, the organotin catalysts, are not in contact too long prior to the forming of a polymer. Undesirable reactions, for example, a transesterification, can occur upon extended contact between the two catalyst systems. Such reactions and interactions can lessen catalyst effectiveness and cause other undesirable effects too.

Catalyst systems of the present invention, which are effective isocyanurate catalysts can also be used with conventional isocyanurate catalysts. For example, such a combination could be chosen in order to modify a reaction profile. Suitable isocyanurate catalysts for use with the present invention include those which catalyze the formation of isocyanurates such as those mentioned in Saunders and Frisch, *Polyurethanes, Chemistry and Technology* in 1 *High Polymers* Vol. XVI, pp. 94–97 (1962). Such catalysts are referred to herein as trimerization catalysts. Examples of these catalysts include aliphatic and aromatic tertiary amine compounds, organometallic compounds, alkali metal salts of carboxylic acids, phenols and symmetrical triazine derivatives. Preferred trimerization catalysts are potassium salts of carboxylic acids such as potassium octoate and tertiary amines such as, for instance, 2,4,6-tris(dimethyl aminomethyl) phenol.

The catalyst systems of the present invention can be used with or without other catalyst systems to prepare polymers having urethane groups. Urethane groups within a polymer can desirably decrease friability. Urethanes groups can be formed by reacting an isocyanate and a hydroxyl active hydrogen containing compound. Active hydrogen containing compounds most commonly used in polyurethane production are those compounds having at least two hydroxyl groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with this invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols, pentols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols.

Polyamines, amine-terminated polyols, polymercaptans and other isocyanate-reactive compounds are also suitable in preparing the foams of the present invention. Polyisocyanate polyaddition active hydrogen containing compounds (PIPA) are particularly preferred for use with the present invention. PIPA compounds are typically the reaction products of toluene diisocyanate and triethanolamine and are dispersed in another active hydrogen containing compound, such as a polyol. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

The catalyst systems of the present invention can be used to increase the rate of formation of oxazolidinone groups. Oxazolidinone groups are formed by the reaction of an isocyanate group and an epoxy group. Any epoxy group containing compound can used to prepare the polymers of the present invention, but preferably the epoxy compounds are polyepoxides and have an average number of epoxy groups of about two epoxy groups per molecule. Suitable such epoxy-containing compounds include the glycidyl ethers or glycidyl esters or glycidyl amines or glycidyl thioethers of aromatic or aliphatic or cycloaliphatic compounds having an average of more than one reactive hydrogen atom per molecule, such as those compounds having an average of more than one aliphatic or aromatic or cycloaliphatic hydroxyl, carboxyl, thiol, or primary or secondary amino group per molecule and the like.

Particularly suitable epoxy-containing compounds for the practice of the present invention include, for example, the diglycidyl ethers of compounds containing two aliphatic hydroxyl groups per molecule or two aromatic hydroxyl groups per molecule or two cycloaliphatic hydroxyl groups per molecule or any combination thereof including such compounds as those having one aromatic hydroxyl group per molecule and the other being an aliphatic or cycloaliphatic hydroxyl group per molecule. Preferably, the epoxy-containing compound is a diglycidyl ether of biphenol, bisphenol A, bisphenol F, bisphenol K, bisphenol S, or the $C_1$–$C_4$ alkyl or halogen, preferably bromine, substituted derivatives thereof. Also, particularly suitable are the glycidyl esters of aliphatic, cycloaliphatic or aromatic carboxylic acids or acid anhydrides. Particularly suitable are the glycidyl esters of those acids or anhydrides having from about 2 to about 30, more suitably from about 2 to about 20, most suitably from about 2 to about 10, carbon atoms per molecule. Preferably, the glycidyl ester compounds include, for example, the glycidyl esters of glutaric acid, phthalic acid, hexahydrophthalic acid, succinic acid, maleic acid, pyromellitic acid, tetrahydrophthalic acid, adipic acid, combinations thereof and the like.

The catalyst systems of the present invention are surprisingly efficient at increasing the rate of forming of amide groups. Amide groups can be formed by reacting an isocyanate group and a carboxylic acid group and/or an acid anhydride group. Preferably, the amide group containing polymers of the present invention are formed with di- or tri-functional carboxylic acids. Such carboxylic acids include but are not limited to aliphatic di- and tri-carboxylic acids and aromatic di-and tri-carboxylic acids. Exemplary of such acids are oxalic acid, succinic acid, adipic acid, azelaic acid, phthalic acid, terephthalic acid, cyclohexane dicarboxylic acid, cyclohexane tri-carboxylic acid and benzene tri-carboxylic acid. However, as already detailed above, care should be taken that carboxylic acids other than those suitable for preparing the catalyst systems of the present invention not be combined with the catalysts system components such that the catalyst system is rendered ineffective or difficult to handle.

In addition to catalyzing the reaction of isocyanates with other compounds, the catalyst systems of the present invention can be used to increase the rate of forming of isocyanurate groups. Isocyanurate groups are formed by combining three isocyanate groups into a single cyclic group. Polymers are rarely prepared from formulations wherein the only molecular weight increasing reaction is the forming of an isocyanurate group. Polymer foams especially wherein there is only isocyanurate linkage tend to be very friable. Therefore, in addition to isocyanurate linkages, polyisocyanurate foams will typically also have other groups present such as urethane or oxazolidinone groups.

Certain properties of polymers, particularly of polymer foams, can be measured to characterize the polymer. For polymer foams, these properties can include, density, friability, open cell content, high temperature weight loss, compressive strength, shear strength, glass transition point and reactivity profile. Density of polymer foams can be measured by ASTM Method C 303-90 *Standard Test Method for Density of Preformed Block-Type Thermal Insulation*. Friability of polymer foams can be measured by ASTM Method C 421-88 *Standard Test Method for Tumbling Friability of Preformed Block-Type Thermal Insulation*. Open cell content can be measured by ASTM Method D 2856-87 *Standard Test Method for Open Cell Content of Rigid Cellular Plastics by the Air Pycnometer*. High temperature weight loss can be determine by placing a sample of foamed polymer into the sample chamber of thermogravametric analyzer. The sample is held at 200° C. for 17 hours. The loss of weight by the sample is determined and reported as percentage weight loss. Compressive strength can be measured by ASTM Method D 1621-73 *Standard Test Method for Compressive Properties of Rigid Cellular Plastics*. Shear strength can be measured by ASTM Method C 273-61 (reapproved 1988) *Standard Test Method for Shear Properties in Flatwise Plane of Flat Sandwich Constructions or Sandwich Cores*.

A glass transition point is that temperature whereat a material which is amorphous changes from a brittle state to a plastic state. It can be determined by placing a sample into the sample chamber of a differential scanning calorimeter (DSC). A DSC is a device which measures the rate at which a sample absorbs heat during heating or emits heat during cooling. The glass transition point of the foams of the present invention can be determined using a heating/cooling profile wherein the first heating is from −120° C. to 250° C. at 20° C. per minute, a first cooling of from 250° C. to −120° C. at 20° C. per minute and a second heating at from −120° C. to 450° C. at 20° C. per minute. Changes of state, such as glass transition, are identifiable due to a differential in the rate of absorbing or emitting heat of a sample across the same temperature gradient due to the additional energy required to change state as well as temperature. The temperature at which the change described hereinabove occurs is reported as the glass transition temperature.

The comparative effectiveness of a catalyst can be determined by observing its effect on reactivity. For the purposes of the present invention, reactivity can be determined by measuring the time from mixing of a polyisocyanate or an admixture of polyisocyanates with a catalyst until specific phenomena are observed in a forming polymer. The more quickly these phenomena occur, the more effective the catalyst therein. These phenomena include:

a) Gel time: the time in seconds from mixing until the foaming admixture first begins to produce "strings" adhering to a wooden spatula quickly inserted and removed from the admixture; and b) Tack-free time: the time in seconds from mixing until the polymer surface loses its sticky quality.

The foamed polymers of the present invention can be prepared with conventional additives. For example, the foamed polymers of the present invention can be prepared with formulations including a surfactant, a dye, a pigment, a fire retardant, a filler and any other additive which is known to those skilled in the art of preparing polymer foams to be useful.

The following examples and comparative examples are meant to be illustrative of the present invention. These examples and comparative examples are not intended to limit the claims of the present inventions and they should not be so interpreted.

EXAMPLE 1

A low density, amide modified, heat resistant polyisocyanurate foam is prepared by admixing 89 parts of a polymethylene polyphenyl polyisocyanate containing about 25 to about 35 weight percent methylene diisocyanate and having an average functionality of about 3.0 (PAPI 580*) and an admixture of 6.4 parts ethyl hexanoic acid, 2.1 parts polyether modified polysiloxane surfactant (B-8404*), 1.7 parts N,N′,N″-tris-(N,N-dimethylaminopropyl)-s-triazine and 1.7 parts 75 percent potassium 2-ethylehexanate and 25 percent diethylene glycol (HEXCHEM 977*). (*PAPI 580 is a trade designation of The Dow Chemical Company; *B-8404 is a trade designation of the Th. Goldschmidt Company; *HEXCHEM 977 is a trade designation of the Mooney Chemical Corporation.) This is a molar ratio of monocarboxylic acid component to triazine component of 8.8:1. All of the components except the isocyanate are first mixed at ambient temperature. Then the isocyanate is added and the admixture is mixed at about 2,000 rpm at 72° F. (22.2° C.) for about 10 seconds. The admixture is poured into a 14″ (35.6 cm)×14″×14″ box and allowed to rise. The resulting foam is allowed to cure at ambient temperature for 48 hours. After curing, the foam is tested and shown to have the following properties:

Density : 3.48 pounds per cubic foot (55.8 kg/m3);
Open Cell Content : 1.44 percent;
Friability : 36 percent;
Weight Loss : 1.4 percent (225° C. for 17 hours);
Glass Transition : 330° C.

EXAMPLE 2

An amide, oxazolidinone, urethane modified polyisocyanurate foam is prepared using substantially the same method as in Example 1 except that 70 parts of the isocyanate is used, the isocyanate is a polymethylene polyphenyl polyisocyanate containing about 40 to about 50 weight percent methylene diisocyanate and having an average functionality of about 2.7 (PAPI 27*), and the isocyanate reactive admixture contains 13 parts of a diglycidyl ether of bisphenol A having a epoxy equivalent weight of 182–192 (DER 331*), 0.5 parts N,N′,N″-tris-(N,N-dimethylaminopropyl)-s-triazine, 3.0 parts ethyl hexanoic acid, 0.15 parts water, 1.4 parts B-8404 surfactant, 9.0 parts 500 molecular weight difunctional butylene oxide based polyether polyol and 0.9 parts HEXCHEM 977 catalyst. (*PAPI 27 is a trade designation of The Dow Chemical Company; *DER 331 is a trade designation of The Dow Chemical Company.) After curing, the foam is tested and shown to have the following properties:

Density : 8.00 pounds per cubic foot (128 kg/m3);
Weight Loss : 1.49 percent (200° C. for 17 hours);
Glass Transition : 278° C.;
Compressive : 280 pounds per square inch
Strength (1930.5 kPa);
Shear Strength : 51.1 pounds per square inch (352 kPa).

EXAMPLE 3

50 grams of PAPI 27 polyisocyanate is admixed with 0.4 grams of catalyst at ambient temperature wherein the catalyst is composed of N,N′,N″-tris-(N,N-dimethylaminopropyl)-s-triazine and ethyl hexanoic acid in a molar ratio of acid to triazine of 1:1.* The forming polymer is observed for both gel and tack free times. The times are recorded in the Table. The experiment is repeated with the ratio of monocarboxylic acid to triazine adjusted to 3:1 and the forming polymer is observed for both gel and tack free times. The times are recorded in the Table. The experiment is repeated with the ratio of monocarboxylic acid to triazine adjusted to 6:1 and the forming polymer is observed for both gel and tack free times. The times are recorded in Table 1. (*Note: a catalyst having a ratio of monocarboxylic acid to triazine of 1:1 is not an embodiment of the present invention.

EXAMPLE 4

Example 3 is repeated substantially identically except that ethyl butyric acid is used instead of ethyl hexanoic acid.

EXAMPLE 5

Example 3 is repeated substantially identically except that isobutyric acid is used instead of ethyl hexanoic acid.

COMPARATIVE EXAMPLE 6

Example 3 is repeated substantially identically except that n-propionic acid is used instead of ethyl hexanoic acid.

COMPARATIVE EXAMPLE 7

Example 3 is repeated substantially identically except that acetic acid is used instead of ethyl hexanoic acid.

COMPARATIVE EXAMPLE 8

Example 3 is repeated substantially identically except that formic acid is used instead of ethyl hexanoic acid and the observations of the forming polymer are made at only a 1:1 ratio.

COMPARATIVE EXAMPLE 9

Example 3 is repeated substantially identically except that hydrochloric acid is used instead of ethyl hexanoic acid and the observations of the forming polymer are made at only a 1:1 ratio.

TABLE 1

| | | Reaction Profile | |
|---|---|---|---|
| Acid Component | Acid/Amine Ratio | Gel Time seconds | Tack Free Time seconds |
| Example 3 | 1:1* | 63 | 99 |
| Ethylhexanoic Acid | 3:1 | 75 | 160 |
| (C8) | 6:1 | 125 | 305 |
| Example 4 | 1.1* | 54 | 75 |
| Ethylbutyric Acid | 3:1 | 58 | 125 |
| (C6) | 6:1 | 135 | 330 |
| Example 5 | 1:1* | 59 | 87 |
| Isobutyric Acid | 3:1 | 45 | 95 |
| (C4) | 6:1 | 85 | 235 |
| Comparative Example 6* | 1:1 | 90 | 120 |
| n-Propanoic Acid | 3:1 | 40 | 65 |
| (C3) | 6:1 | >600 | >600 |
| Comparative Example 7* | 1:1 | 86 | 110 |
| Acetic Acid | 3:1 | 230 | >600 |
| (C2) | 6:1 | >600 | >600 |
| Comparative Example 8* Formic Acid (C1) | 1:1 | >600 | >600 |
| Comparative Example 9* HCl | 1:1 | 195 | 230 |

*Not an example of the present invention.

EXAMPLE 10

An oxazolidone foam is prepared by admixing 70 parts of a polymethylene polyphenyl polyisocyanate containing about 25 to about 35 weight percent methylene diisocyanate and having an average functionality of about 3.0 (PAPI 580*) with 30 parts of of a diglycidyl ether of polypropylene glycol having a epoxy equivalent weight of 305-335 (DER 732*), 2 parts polyether modified polysiloxane surfactant (B-8404*), 5 parts ethylhexanoic acid and 1.8 parts N,N',N''-tris-(N,N-dimethylaminopropyl)-s-triazine (*PAPI 580 is a trade designation of The Dow Chemical Company; *DER 752 is a trade designation of The Dow Chemical Company; *B-8404 is a trade designation of the Th. Goldschmidt Company). Gel time is determined and displayed in Table 2.

COMPARATIVE EXAMPLE 11

Example 10 is repeated substantially identically except that 5 parts of N,N',N''-tris-(N,N-dimethylaminopropyl)-s-triazine is used instead of 1.8 parts and 2 parts of a chlorofluorocarbon blowing agent are used instead of 5 parts of ethylehexanoic acid. Gel time is determined and displayed in Table 2.

COMPARATIVE EXAMPLE 12

Example 10 is repeated substantially identically except that instead of 1.8 parts of N,N',N''-tris-(N,N-dimethylaminopropyl)-s-triazine, 1.8 parts of DMP-30* are used. (*DMP30 is a trade designation of the Rohm & Haas Company.) Gel time is determined and displayed in Table 2.

COMPARATIVE EXAMPLE 13

Comparative Example 11 is repeated substantially identically except that instead of 5 parts of N,N',N''-tris-(N,N-dimethylaminopropyl)-s-triazine, 5 parts of DMP30* are used. (*DMP-30 is a trade designation of the Rohm & Haas Company.) Gel time is determined and displayed in Table 2.

COMPARATIVE EXAMPLE 14

Example 10 is repeated substantially identically except that instead of 1.8 parts of N,N',N''-tris-(N,N-dimethylaminopropyl)-s-triazine, 1.8 parts of DABCO-33LV* are used. (*DABCO-33LV is a trade designation of Air Products and Chemicals, Incorporated.) Gel time is determined and displayed in Table 2.

COMPARATIVE EXAMPLE 15

Comparative Example 11 is repeated substantially identically except that instead of 5 parts of N,N',N''-tris-(N,N-dimethylaminopropyl)-s-triazine, 5 parts of *DABCO-33LV are used. (*DABCO-33LV is a trade designation of Air Products and Chemicals, Incorporated.) Gel time is determined and displayed in Table 2.

TABLE 2

| Example Number | Catalyst Type | Acid:Amine Molar Ration | Gel Time Seconds |
|---|---|---|---|
| Example 10 | triazine | 6.6 | 55 |
| Comparative Example 11 | triazine* | — | 200 |
| Comparative Example 12 | DMP 30*+ | 5.2 | <600 |
| Comparative Example 13 | DMP 30*+ | — | 105 |
| Comparative Example 14 | DABCO-33LV*++ | 0.7 | <600 |
| Comparative Example 15 | DABCO-33LV*++ | — | 180 |

*Not an example of the present invention.
+DMP 30 is 2,4,6-tris(dimethyl amino methyl)phenol
++DABCO-33LV is 3390 triethylenediamino in diproplenegylgol

What is claimed is:

1. A catalyst system comprising:
   (A) an N,N',N''-tris(N,N-dialkylaminoalkyl)-s-triazine component; and
   (B) a monocarboxylic acid component;

wherein the monocarboxylic acid component is a monocarboxylic acid or a mixture of monocarboxylic acids having from 4 to 18 carbons, and the molar ratio of the monocarboxylic acid component to the N,N',N''-tris(N,N-dialkylaminoalkyl)-s-triazine component is from about 2:1 to about 25:1.

2. The composition of claim 1 wherein N,N',N''-tris(N,N-dialkylaminoalkyl)-s-triazine component corresponds to the general formula:

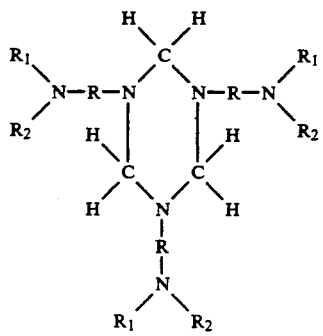

wherein
each R is independently a $C_1$–$C_4$ alkylene group; and
wherein
each $R_1$ and $R_2$ are independently a $C_1$–$C_{10}$ linear or branched alkyl.

3. The composition of claim 2 wherein the N,N',N''-tris(N,N-dialkylaminoalkyl)-s-triazine component is N,N',N''-tris-(N,N-dimethylaminopropyl)-s-triazine, N,N',N''-tris-(N,N-dimethylaminoethyl)-s-triazine or mixtures thereof.

4. The composition of claim 3 wherein the N,N',N''-tris(N,N-dialkylaminoalkyl)-s-triazine component and the monocarboxylic acid component are present such that the molar ratio of the monocarboxylic acid component to the N,N',N''-tris(N,N-dialkylaminoalkyl)-s-triazine component is from about 6:1 to about 12:1.

5. The composition of claim 1 wherein the monocarboxylic acid component has from 4 to about 8 carbon atoms.

6. The composition of claim 5 wherein the monocarboxylic acid component is selected from the group consisting of ethyl hexanoic acid, ethyl butyric acid, isobutyric acid and mixtures thereof.

7. A method of preparing polymers comprising reacting a di- or poly-isocyanate, or mixtures thereof, in the presence of an effective amount of a mixture containing:
(1) a N,N',N''-tris(N,N-dialkylaminoalkyl)-s-triazine component; and
(2) a monocarboxylic acid component containing one or more monocarboxylic acids having from 4 to about 18 carbons;
wherein the molar ratio of the monocarboxylic acid component to the N,N',N''-tris(N,N-dialkylaminoalkyl)-s-triazine component is from about 2:1 to about 25:1.

8. The method of claim 7 wherein the di- or poly-isocyanate or mixtures thereof is selected from the group consisting of a multivalent polyisocyanate, a modified polyisocyanate, a prepolymer and mixtures thereof.

9. The method of claim 8 wherein the di- or poly-isocyanate or mixtures thereof is methylene diphenyl-diisocyanate based.

10. The method of claim 9 wherein the N,N',N''-tris(N,N-dialkylaminoalkyl)-s-triazine catalyst component is N,N',N''-tris-(N,N-dimethylaminopropyl)-s-triazine, N,N',N''-tris-(N,N-dimethylaminoethyl)-s-triazine or mixtures thereof.

11. The method of claim 10 wherein the monocarboxylic acid catalyst component is selected from the group consisting of ethyl hexanoic acid, ethyl butyric acid, isobutyric acid and mixtures thereof.

12. The method of claim 11 additionally comprising reacting an active hydrogen containing material with the di- or poly-isocyanate, or mixtures thereof.

13. The method of claim 12 wherein the N,N',N''-tris(N,N-dialkylaminoalkyl)-s-triazine catalyst component and the monocarboxylic acid catalyst component are first admixed with each other.

14. The method of claim 13 wherein the catalyst system is first admixed with the active hydrogen containing material.

15. A polymer prepared by the method of claim 7.

16. The polymer of claim 15 wherein the molar ratio of the monocarboxylic acid catalyst component to the N,N',N''-tris(N,N-dialkylaminoalkyl)-s-triazine catalyst component and the amount of catalyst system present is sufficiently high to foam the polymer.

17. The polymer of claim 15 wherein the reactants are reacted in the presence of one or more blowing agents other than the monocarboxylic acid catalyst component.

18. The polymer of claim 16 wherein the reactants are reacted in the presence of one or more additional catalysts.

19. The polymer of claim 16 wherein the di- or poly-isocyanate, or mixtures thereof, is reacted with a base polyol.

20. The polymer of claim 19 wherein the reactants are reacted in the presence of one or more additives selected from the group consisting of a surfactant, a dye, a pigment, a fire retardant, a filler and mixtures thereof.

* * * * *